United States Patent [19]

Okamoto et al.

[11] Patent Number: 4,959,969
[45] Date of Patent: Oct. 2, 1990

[54] REFRIGERATING CIRCUIT APPARATUS WITH MEMORY HAVING A PLURALITY OF CONTROLLING MODES

[75] Inventors: Hiroshi Okamoto, Fuji; Kimio Fushimi, Simizu; Satoru Mochizuki; Yoshio Ootuka, both of Fuji, all of Japan

[73] Assignee: Kabushiki Kaisha Toshiba, Kawasaki, Japan

[21] Appl. No.: 354,813

[22] Filed: May 22, 1989

[30] Foreign Application Priority Data

Sep. 30, 1988 [JP] Japan .................. 63-24672

[51] Int. Cl.$^5$ ......................... G05D 23/32
[52] U.S. Cl. ................... 62/157; 62/228.4; 236/78 D; 417/45
[58] Field of Search ............ 62/228.3, 228.4, 226, 62/157; 417/45; 236/78 D; 364/161; 318/609

[56] References Cited

U.S. PATENT DOCUMENTS 3,646,454 2/1972 Southern ............... 364/161 X
4,675,804 6/1987 Wiemer ................ 364/161

FOREIGN PATENT DOCUMENTS 54-88642 7/1979 Japan .
60-39842 3/1985 Japan .
62-225857 10/1987 Japan .

Primary Examiner—William E. Wayner
Attorney, Agent, or Firm—Cushman, Darby & Cushman

[57] ABSTRACT

A refrigerating circuit apparatus comprises a variable capacity compressor for compressing refrigerant, an inverter circuit for supplying a variable output frequency to the compressor, a memory for storing data representing at least two different control modes including a first mode wherein the output frequency of the inverter circuit is changed at one frequency changing rate until the difference between the actual pressure value of refrigerant flowing into the compressor and a set value is minimum and a second mode wherein the output frequency of the inverter circuit is changed at a different frequency changing rate until the difference between the actual pressure value of refrigerant flowing into the compressor and the set value is minimum, a select switch for selecting either first or second mode stored in the memory and a control circuit for varying the output frequency of the inverter circuit based on the selected mode to control the rotation speed of the compressor. Thus, the refrigerating circuit apparatus may be adopted to different kinds of refrigerating apparatus, e.g., display cases or refrigerators, by selecting either first or second mode stored in the memory.

10 Claims, 5 Drawing Sheets

REFRIGERATING CIRCUIT APPARATUS WITH MEMORY HAVING A PLURALITY OF CONTROLLING MODES

BACKGROUND OF THE INVENTION

1. Field of the Invention

The present invention relates, in general, to refrigerating circuit apparatus. In particular, the present invention relates to a refrigerating circuit apparatus that is provided with an inverter circuit for controlling the rotation speed of a compressor.

2. Description of the related art

In a conventional air conditioning apparatus or display case, a refrigerating circuit typically includes a compressor, a condenser, a de-compressing device, e.g., expansion valve, and an evaporator. The refrigerating circuit also includes an inverter circuit supplying a driving frequency to the compressor. The output frequency of the inverter circuit is controlled in response to an air conditioning load or a refrigerating load to drive the compressor at a suitable ability, resulting in decrease in energy consumption of the compressor. The output frequency of the inverter circuit is controlled to minimize the difference (air conditioning load or refrigerating load) between the suction side refrigerant pressure $P_s$ of the compressor and a set value $P_c$. In this case, a zone control method is employed to control the output frequency of the inverter circuit. A plurality of pressure deviation zones are defined in the zone control method. The output frequency of the inverter circuit is controlled such that changes of the output frequency of the inverter circuit are fast in a pressure deviation zone where the difference (pressure deviation) between the suction side refrigerant pressure $P_s$ and the set value $P_c$ is large. On the other hand, changes of the output frequency of the inverter circuit are slow in another pressure zone where the difference between the suction side refrigerant pressure $P_s$ and the set value $P_c$ is small.

In a practical manner, a refrigerating circuit apparatus includes a compressor, a condensor, an accumulator and a control circuit having an inverter circuit. Such a refrigerating circuit apparatus may be applied to different kinds of refrigerating apparatus, e.g., display cases, refrigerators, etc., having an evaporator and an expansion valve at a user side. Such refrigerating apparatus have different refrigerating loads, and thus, require suitable control operations that are different from one another. However, in the conventional refrigerating circuit apparatus, only one pattern of the changing speed of the output frequency fed from the inverter circuit is provided, although the changing speed of the output frequency in one zone is different from that in another zone. Thus, it is difficult to adapt the refrigerating circuit apparatus to different uses where each use or application requires a different control operation.

On the other hand, since a pseudo pulse width modulation (PWM) control method is generally used in the inverter circuit, the output waveform of the inverter circuit usually includes a lot of high frequency components as compared with a sine-wave component. Thus, vibration of the windings of the compressor motor may be caused by such high frequency components of the output waveform, and a vibration noise may occur from the motor. The tone of the vibration noise may change every time the output frequency of the inverter circuit changes. Such vibration noise becomes notably audible during nighttime. This is because the output frequency of the inverter circuit is changed in accordance with the conventional zone control method wherein only one pattern of the changing speed of the output frequency fed from the inverter is provided, even though the refrigerating load does not change frequently during nighttime.

SUMMARY OF THE INVENTION

Accordingly, it is an object of the present invention to adapt a refrigerating circuit apparatus to different kinds of refrigerating apparatus.

It is another object of the invention to decrease vibration noise from a compressor of a refrigerating circuit apparatus, particularly at night.

To accomplish the above objects, a refrigerating circuit apparatus includes a variable compressing section, including a compressing element and a variable rotation element for driving the compressing element, for discharging refrigerant having a discharge side pressure and for drawing refrigerant having a suction side pressure lower than the discharge side pressure, and a driving frequency supply section for supplying a variable output frequency to the variable rotation element to rotate the rotation element. The refrigerating circuit apparatus also includes a select switch for selecting one of at least two different control modes including a first mode having one rate of change of the output frequency of the driving frequency supply section and a second mode having a different rate of change of the driving frequency supply section, and a control section for varying the output frequency of the driving frequency supply section in accordance with the selected mode to control the rotation speed of the variable rotation element.

BREIF DESCRIPTION OF THE DRAWINGS

The present invention will be better understood by reference to the accompanying drawings, wherein like reference numerals throughout the various FIGS. denote like structural elements and wherein.

DETAILED DESCRIPTION OF THE PREFERRED EMBODIMENTS

Figure 1:
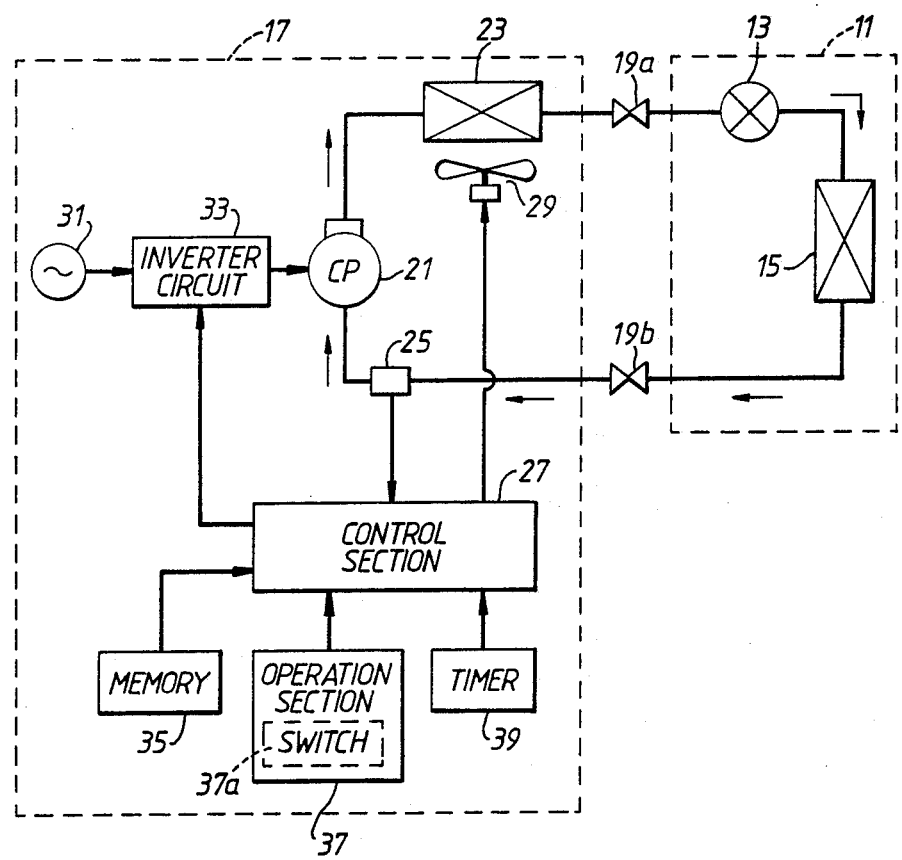
FIG. 1 is a refrigerating circuit diagram illustrating one embodiment of the present invention.

Preferred embodiments of the present invention will be described in more detail with reference to the accompanying drawings. A display case 11 includes an expansion valve 13 and an evaporator 15 connected in series. Display case 11 is connected to refrigerating circuit apparatus 17 through a pair of connecting valves 19a, 19b. Refrigerating circuit apparatus 17 includes a variable capacity compressor 21 and a condenser 23. The discharge port of compressor 21 is connected to expansion valve 15 of display case 11 through condenser 23 and one of the connecting valves 19a. The suction port of compressor 21 is connected to evaporator 15 of display case 11 through the other connecting valve 19b. A pressure sensor 25 is disposed in the suction line between the evaporator 15 of display case 11 and the suction port of compressor 21 to detect the pressure of refrigerant taken into compressor 21 through the suction port. The detection result of pressure sensor 25 is transmitted to a control section 27. Control section 27 includes a microcomputer and its peripheral circuits to control the operation of refrigerating circuit apparatus 17. A fan device 29 is arranged opposite to condenser 23. The rotation speed of fan device 29 is controlled by control section 27. Compressor 21 is connected to a power supply 31 through an inverter circuit 33 to control the compressing capacity of compressor 21. Inverter circuit 33 rectifies an AC voltage fed from power supply 31, and inverts the rectified voltage to an AC voltage having a required frequency in response to control section 27 to supply the required frequency to compressor 21, as a driving frequency.

An external memory 35 is connected to control section 27. A plurality of control patterns (modes) each of which has a different speed variation of an output frequency f of inverter circuit 33 are previously stored in memory 35. An operation section 37 is connected to control section 27. A user may input a desired operation command into a control section through operation section 27. Operation section 37 includes a select switch 37a having a plurality of switch elements (not shown) to select a desirable control pattern (mode) from the plurality of control patterns stored in external memory 35. A timer 39 is also connected to control section 27 to provide a reference time. Thus, control section 27 includes a first control function wherein the output frequency f of inverter circuit 33 is controlled in response to a refrigerating load, and a second control function wherein a desirable variation speed of the output frequency f of inverter circuit 33 is selected from the plurality of control patterns stored in memory 35 in response to the operation of select switch 35a. The refrigerating load is the difference between the suction side pressure Ps detected by pressure sensor 25 and a set value Pc.

The following TABLE 1 shows the plurality of control patterns (modes) of speed variation of the output frequency f of inverter circuit 33.

TABLE 1

| MODE<br>ZONE | a<br>(Hz)(sec) | b<br>(Hz)(sec) | c<br>(Hz)(sec) | d<br>(Hz)(sec) |
|---|---|---|---|---|
| A | 5/5 | 5/10 | 5/5 | 5/20 |
| B | 5/15 | 5/30 | 5/5 | 5/60 |
| C | 5/30 | 5/60 | 5/15 | 5/120 |
| D | 0 | 0 | 0 | 0 |
| E | 0 | 0 | 0 | 0 |
| F | 5/30 | 5/60 | 5/15 | 5/120 |
| G | 5/15 | 5/30 | 5/5 | 5/60 |
| H | 5/5 | 5/10 | 5/5 | 5/20 |

As can be seen in the TABLE 1, eight frequency variation zones are determined with regard to the deviation of the suction side refrigerant pressure Ps against the set value Pc. The range of each frequency variation zone is set at 0.1. Thus, zone A indicates the maximum deviation of the suction side refrigerating pressure Ps in a positive direction. Zone H also indicates the maximum deviation of pressure Ps in a negative direction. TABLE 2 shows each lower threshold value of the frequency variation zones in a descending direction of the suction side refrigerant pressure Ps.

TABLE 2

| ZONE | LOWER THRESHOLD VALUE |
|---|---|
| A | +0.3 |
| B | +0.2 |
| C | +0.1 |
| D | 0 |
| E | −0.1 |
| F | −0.2 |
| G | −0.2 |
| H | −0.4 |

TABLE 3 shows each upper threshold value of the frequency variation zones in an ascending direction of the pressure Ps.

TABLE 3

| ZONE | UPPER THRESHOLD VALUE |
|---|---|
| A | — |
| B | +0.4 |
| C | +0.3 |
| D | +0.2 |
| E | +0.1 |
| F | 0 |
| G | −0.1 |
| H | −0.2 |

As shown in TABLE 1, four different control modes a, b, c and d are provided in each frequency variation zone. Each mode is stored in memory 35, as stated before.

The mode a is suitable for the refrigerating load of a general display case which is used at a supermarket, as an open showcase. The mode b is suitable for the refrigerating load of a relatively small prefabricated refrigerating warehouse. The mode c is adapted to the refrigerating load of a display case or a refrigerator which requires a precise temperature control. The mode d is suitable for a relativley large refrigerating warehouse which uses a plurality of refrigerating apparatus. The mode d also is adapted to a self control type display case or refrigerator which uses an electronic expansion value to control the temperature therein by itself.

Figure 2:
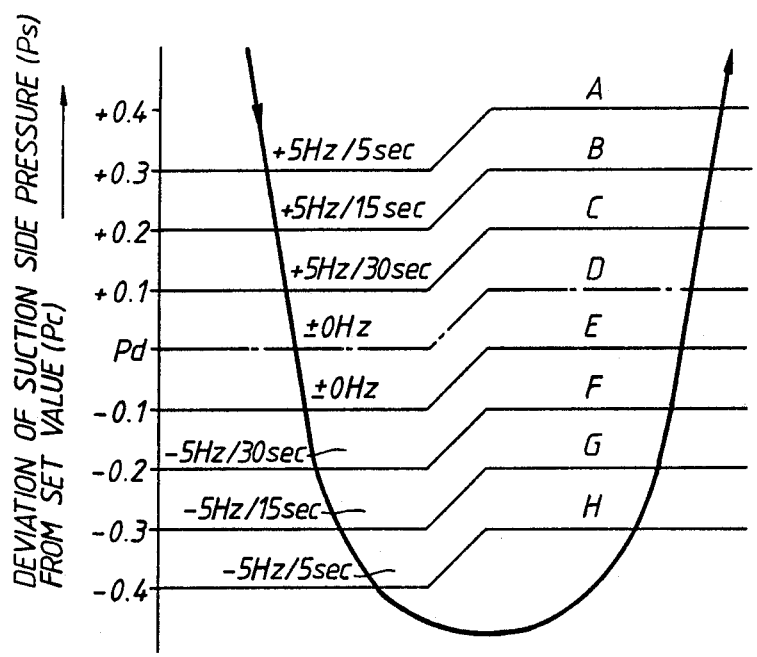
FIG. 2 is a diagram illustrating a relationship between the deviation of a suction side pressure $P_s$ and the variation speed of the output frequency f of the inverter circuit shown in FIG. 1 in terms of a zone control.

As stated before, in zones A or H where the refrigerating load is large, the variation speed of the output frequency of inverter circuit 33 is fast, e.g., 5Hz/5 sec in the mode a. Thus, the output frequency increases or decreases by five Hz every five seconds while the deviation of pressure Ps is in zones A or H. On the contrary, in zones C or F where the refrigerating load is small, the variation speed of the output frequency f is slow, e.g., 5Hz/30 sec in the mode c. Thus, the output frequency f increases or decreases by five Hz every thirty seconds while the deviation of pressure Ps is in zones C or F. Each time, data is supplied from timer 39 to control section 27. Data of mode a, including pressure deviation zones and frequency variation patterns of each zone, is illustrated in FIG. 2. If the mode b is selected from the stored modes in memory 35 by select switch 37a, the variation speed of the output frequency f of inverter circuit 33 in each zone is different from that in the mode a. In the mode b, the output frequency f increases or decreases by five Hz every ten seconds while the deviation of pressure Ps is in zone A or H. Furthermore, the output frequency f increases or decreases by five Hz every sixty seconds while the deviation of pressure Ps is in zone C or F. Thus, a suitable control mode a, b, c, or d stored in memory 35 is selected by select switch 37a in accordance with a refrigerating apparatus, e.g., display case or a warehouse, which uses refrigerating circuit apparatus 17.

The operation of the above-described refrigerating circuit apparatus will now be described. First, a desirable control mode, e.g., mode a, is selected from the plurality of control modes stored in memory 35 by select switch 37a. When an operation start command is input into control section 27 through operation section 37, compressor 21 is driven by control section 27 through inverter circuit 33. Thus, refrigerant flows from compressor 21 in a direction indicated by a solid arrow in FIG. 1. During the operation, since the suction side refrigerant pressure Ps is detected by pressure sensor 25, the output frequency f of inverter circuit 33 is controlled based on a selected mode (control pattern) by control section 27 to decrease the pressure deviation between the suction side pressure Ps detected by sensor 25 and the set value Pc. In this case, since the mode a is selected, as a control pattern, prior to the beginning of this control operation, the output frequency f of inverter circuit 33 is controlled based on the control pattern of the mode a, as shown in FIG. 2. Thus, the output frequency f of inverter circuit 33 is reduced by five Hz From a prescribed frequency every five seconds while the deviation of the suction side refrigerant pressure Ps is in zone A. When the deviation of the pressure Ps against the set value Pc moves to zone B, the output frequency f of inverter circuit 33 decreases by five Hz every fifteen seconds.

As stated above, when the refrigerating circuit apparatus 17 is used with a display case which requires a precise temperature control, the mode c is selected from memory 35 by select switch 37a. Thus, the output frequency f of inverter circuit 33 is controlled in accordance with the control pattern in mode c.

Figure 3:
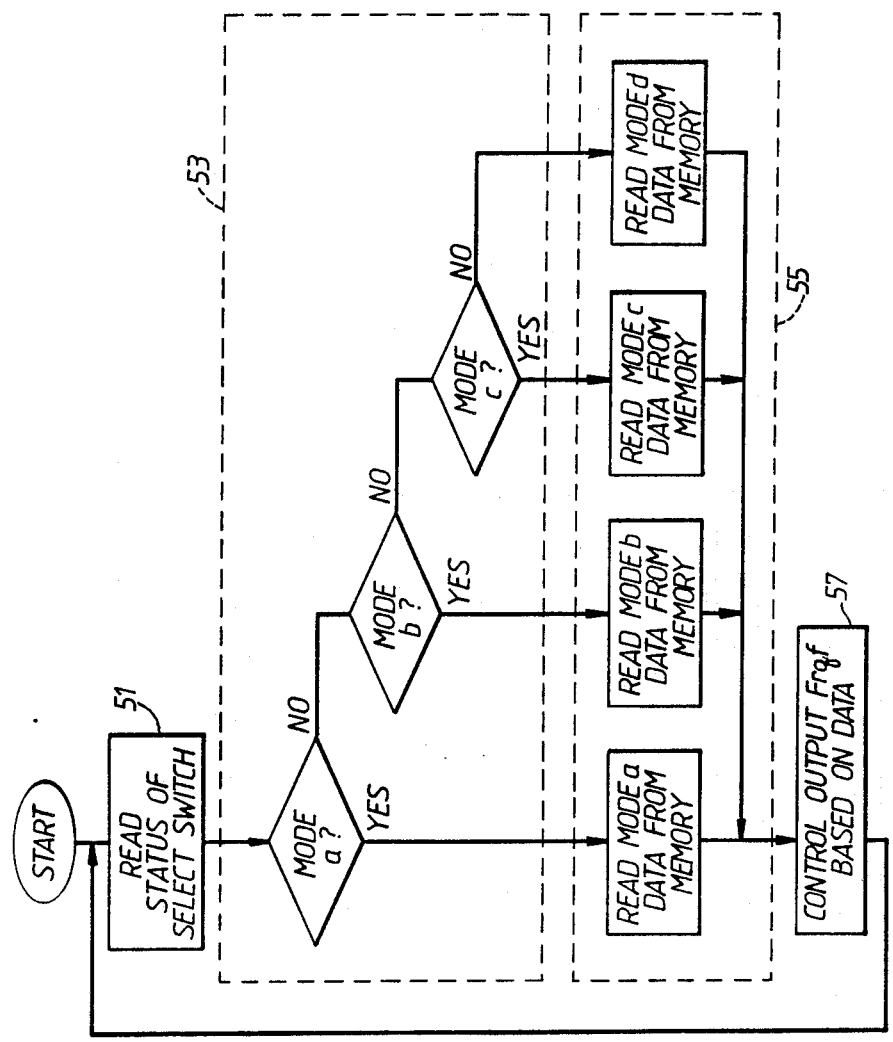
FIG. 3 is a flow-chart illustrating the control operation of the one embodiment.

Thus, as shown in FIG. 3, when the above-described control operation begins, the microcomputer (not shown) in control section 27 reads the status of select switch 37a shown in FIG. 1 (step 51). The microcomputer determines which mode is selected in step 53 based on the status of select switch 37a. In step 55, a selected mode data (control pattern) is read out from memory 35. The output frequency f of inverter circuit 33 is controlled in accordance with the data of the selected mode in step 57. As a result, the rotation speed of compressor 21 is controlled in response to the output frequency f of inverter circuit 33, and thus, refrigerating circuit apparatus 17 can provide an appropriate amount of refrigerant to display case 11.

With the above-described embodiment, since a plurality of variation speed patterns (control mode) of the output frequency f of inverter circuit 33 are stored in memory 35, a desirable speed pattern suitable for a refrigerating apparatus or warehouse which uses the refrigerating circuit apparatus 17 is selected from the plurality of variation speed patterns stored in memory 35. Thus, the refrigerating circuit apparatus 17 of the present invention may be adapted to a various refrigerating load to carry out an efficient refrigerating operation of every refrigerating apparatus or warehouse.

In the above-described embodiment, since the base time of the variation speed of output frequency f in each zone of each mode is determined at a multiple number of five, a simple timer may be used. The range of each zone is determined at a constant value in the above-described embodiment. However, the range of each zone may be different from one another, instead of varying the base time in each zone. Furthermore, the plurality of operation modes may be selected by a remote operation through a wireless operation panel (not shown).

A second embodiment of the present invention will be described. However, in FIG. 4, similar elements to that in FIG. 1 are applied the same numerals, and therefore, detail descriptions thereof are not repeated.

Figure 4:
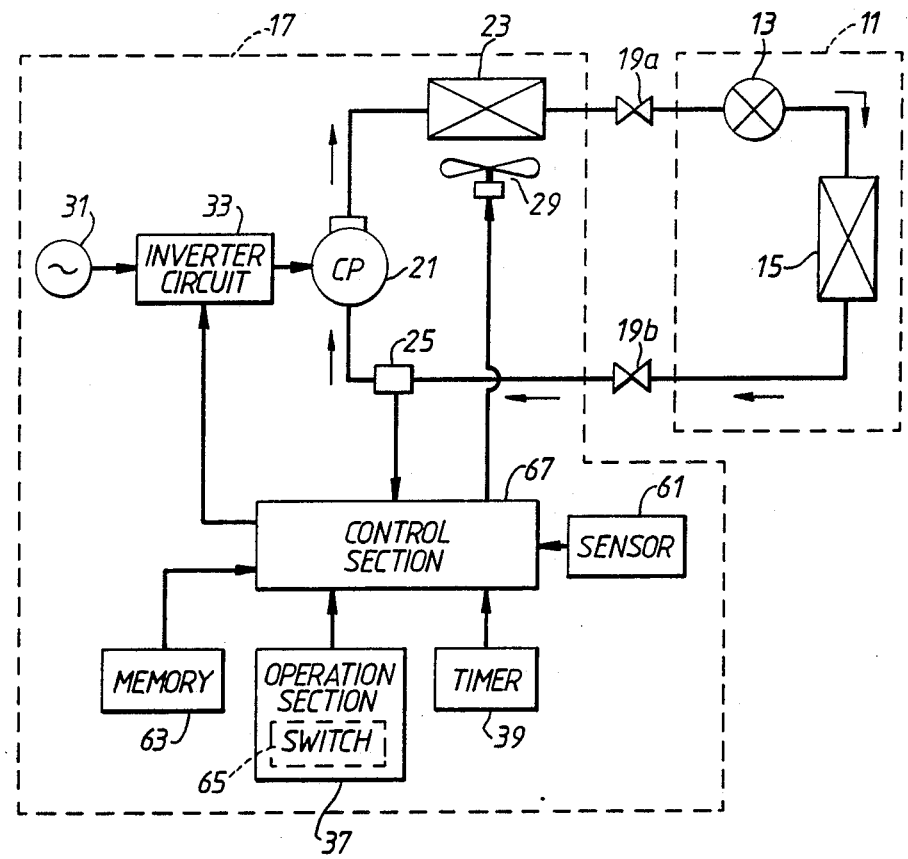
FIG. 4 is a refrigerating circuit diagram illustrating a second embodiment of the present invention.

In FIG. 4, refrigerating circuit apparatus 17 is provided with a photo-sensor 61 to detect a level of ambient light. In this embodiment, two different modes, i.e., a normal mode e and a night mode f, are stored in memory 63. The data of modes e and f relating to respective zones is shown in TABLE 4.

TABLE 4

| MODE ZONE | e (Hz)(sec) | f (Hz)(sec) |
|---|---|---|
| A | 5/5 | 5/20 |
| B | 5/15 | 5/60 |
| C | 5/30 | 5/120 |
| D | 0 | 0 |
| E | 0 | 0 |
| F | 5/30 | 5/120 |
| G | 5/15 | 5/60 |
| H | 5/5 | 5/20 |

Control section 67 of this embodiment includes an auto-change function wherein a control pattern of the output frequency f of inverter circuit 33 is automatically changed between modes e and f in response to the detection result of photo-sensor 61. A switch 65 of operation section 37 has an auto-mode switch element, and the auto-change function of control section 67 is selected when the auto-mode switch element is operated to set the auto-mode into control section 67. It should be noted that switch 65 also includes a switch element for manually selecting either mode e or f when the auto-mode switch element is not set in control section 67.

Figure 5:
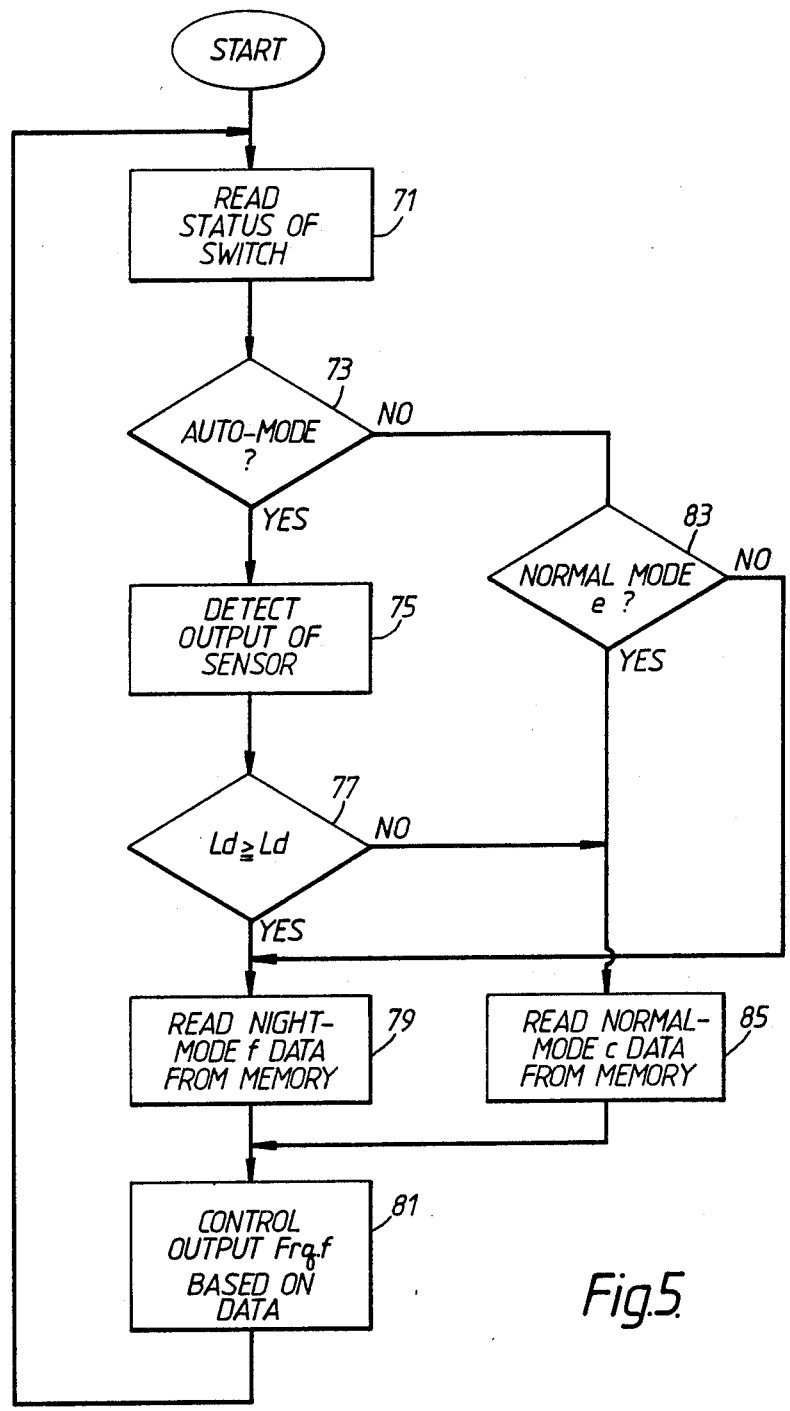
FIG. 5 is a flow-chart illustrating the control operation of the second embodiment.

The operation of the above-described refrigerating circuit apparatus will be described with reference to FIGS. 4 and 5. When a start/stop switch (not shown) in operation section 37 is operated to begin the control operation, the microcomputer (not shown) in control section 67 reads the status of the auto-mode switch element of switch 65 in step 71. In step 73, if the auto-mode is set in control section 67, the YES pass is taken. Otherwise, the NO pass is taken. When the YES pass is taken in step 73, the microcomputer further reads a detection result of photo-sensor 61 in step 75. If the output Ld of photo-sensor 61 is not above the prescribed level Lc, the NO pass is taken in step 77. Otherwise, YES pass is taken. When the YES pass is taken in step 77, the night mode f is read out from memory 63 in step 79. The output frequency f of inverter circuit 33 is controlled on the basis of the control pattern of night mode f in step 81. Thus, the variation speed of the output frequency f of inverter circuit 33 in each zone is controlled slower than that in the normal mode e, as shown in TABLE 4. If the NO pass is taken in step 73, the status of switch 65 further is detected. If the switch 65 is set at a normal mode e, the YES pass is taken in step 83. The normal mode e is read out from memory 63 in step 85, and the above-described step 81 is executed. The output frequency f of inverter circuit 33 is controlled in accordance with the normal mode e in step 81. Thus, the variation speed of the output frequency f in each zone is controlled faster than that in the night mode f. If the NO pass is taken in step 83, steps 79 and 81 are executed. Thus, the output frequency f of inverter circuit 33 is controlled on the basis of the control pattern of night mode f. If the NO pass is taken in step 77, steps 85 and 81 are sequentially executed. Thus, the output frequency f is controlled on the basis of the control pattern of normal mode e.

With the above-described embodiment, since the variation speed of the output frequency f of inverter circuit 33 is slow during nighttime compared with the daytime, changes in the tone of the vibration noise of the motor windings caused by the variation of the output frequency f may be reduced at night. Furthermore, in the second embodiment, the variation speed of the output frequency f of inverter circuit 33 can be automatically changed from one mode to another mode in response to the detection result of photo-sensor 61 when the auto-mode is selected by switch 65.

In general, if the variation speed of the output frequency f of inverter circuit 33 is slow, the control operation to the suction side refrigerant pressure does not respond to the detection result of pressure sensor 25 accurately. However, no practical problem occurs in the second embodiment. This is because heat leakage from the display case decreases at night, and temperatures of articles in the display case are not substantially changed. Thus, it is not necessary to follow changes in the suction side refrigerant pressure. The change of the output frequency f of the inverter circuit may be carried out to control the compressing capacity of the compressor. Refrigerating circuit apparatus 17 of the second embodiment may achieve the reduce in energy consumption during the operation at night. This is because temporary power peaks caused by changes of the output frequency f of inverter circuit 33 reduce at night.

In the above-described second embodiment, the control pattern of the output frequency f of the inverter circuit may be changed in response to the operation of a timer set by a user, instead of using photo-sensor 61. Furthermore, the output frequency f of the inverter circuit may be changed from the normal mode e to a fixed mode wherein the output frequency f of the inverter circuit is set at a fixed value. In this case also, reduced noise and decreased power consumption may be achieved.

The present invention has been described with respect to a specific embodiment. However, other embodiments based on the principles of the present invention should be obvious to those of ordinary skill in the art. Such embodiments are intended to be covered by the claims.

What is claimed is:

1. A refrigerating circuit apparatus comprising:
    variable capacity compressing means, having discharge and suction ports, for discharging refrigerant having a discharge side pressure and for drawing refrigerant having a suction side pressure lower than the discharge side pressure, the variable capacity compressing means including a compressing element and a variable rotation element for driving the compressing element;
    means for supplying a variable output frequency to the variable rotation element for rotating the variable rotation element;
    memory means for storing data defining at least two different predetermined control modes including a first mode having one rate of change of the output frequency of the supplying means and a second mode having a different rate of change of the output frequency;
    means for selecting one of the first and second control modes from the memory means; and
    control means for varying the output frequency of the supplying means in accordance with the selected mode for controlling the rotation speed of the variable rotation element.

2. An apparatus according to claim 1, wherein the one rate corresponds to a constant frequency change over a predetermined time, and the different rate corresponds to the constant frequency change over a prescribed time longer than the predetermined time, and the control means includes counter means for measuring the predetermined time or prescribed time in response to the selecting means.

3. An apparatus according to claim 2, wherein the control means includes a pressure sensor means for detecting the suction side pressure of refrigerant.

4. An apparatus according to claim 3, wherein the control means includes means for modifying the rate of frequency change of the output frequency of the supplying means in response to changes in the suction side pressure of more than a specified increment.

5. An apparatus according to claim 3, wherein each of the first and second control modes have data representing a plurality of suction side pressure deviation zones successively defined from a reference value and each suction side deviation zone has a constant range, the control means including means for modifying the rate of frequency change of the output frequency of the supplying means on the basis of the selected mode when the suction side pressure deviation shifts from one zone to another zone.

6. An apparatus according to claim 1, wherein the control means further includes sensor means for automatically changing the control mode of the apparatus.

7. An apparatus according to claim 6, wherein the sensor means includes a photo-sensor for detecting ambient light.

8. An apparatus according to claim 6, wherein the first mode corresponds a daytime mode and the second mode corresponds a nighttime mode, the apparatus further including switch means for setting an auto-mode wherein one of the daytime mode and the nighttime mode is automatically selected in response to the sensor means.

9. An apparatus according to claim 1 further including timer means for measuring a prescribed target time when the control means automatically changes the control mode.

10. An apparatus according to claim 9, wherein the control means includes switch means for setting an auto-mode wherein one of the first and second modes is automatically changed to the other mode when the timer means achieves the prescribed target time.

* * * * *